United States Patent
Stannebein

[15] 3,685,780
[45] Aug. 22, 1972

[54] SEAT SUSPENSION SYSTEM

[72] Inventor: Clifford E. Stannebein, Brooklyn Center, Minn.

[73] Assignee: J. I. Case Company

[22] Filed: Oct. 30, 1969

[21] Appl. No.: 872,607

[52] U.S. Cl. ..............................248/399, 248/430
[51] Int. Cl. .................................................A47c 3/22
[58] Field of Search......248/399, 430, 429, 376, 373, 248/374, 400, 372

[56] References Cited

UNITED STATES PATENTS

| | | | |
|---|---|---|---|
| 2,104,511 | 1/1938 | Faulhaber | 248/373 |
| 2,414,954 | 1/1947 | Kalter | 248/374 |
| 2,714,001 | 7/1955 | Hersey et al. | 248/400 |
| 2,742,952 | 4/1956 | Bellamy | 248/430 |
| 2,850,073 | 9/1958 | Smith | 248/430 |
| 2,875,810 | 3/1959 | Simons et al. | 248/400 |
| 2,917,350 | 12/1959 | Ragsdale | 248/430 |
| 2,986,199 | 5/1961 | Ferreira et al. | 248/399 |
| 3,109,621 | 11/1963 | Simons et al. | 248/399 |
| 3,244,393 | 4/1966 | Wallerstein, Jr. | 248/430 |
| 849,975 | 4/1907 | Carlson | 248/372 |

Primary Examiner—Edward C. Allen
Attorney—Dressler, Goldsmith, Clement & Gordon

[57] ABSTRACT

A seat suspension system for a vehicle and including a seat attached to a seat support. The seat support is supported for movement through links on a frame attached to the vehicle. The seat suspension system includes stabilizing means in the form of a pair of coil springs having one end attached to the frame and the other end attached to the seat support with the ends of the springs limited for rotational movement only so that the effective spring force per increment of seat displacement increases non-linearly relative to the displacement of the seat support. The stabilizing means further includes a pair of shock absorbers which are positioned between the frame and the seat support and are attached in a manner that the shock absorbers will be substantially fully retracted in the normal ride position of an operator.

The seat suspension system further includes interconnecting mechanism between the seat and seat support which accommodate movement in four directions from a central position.

15 Claims, 5 Drawing Figures

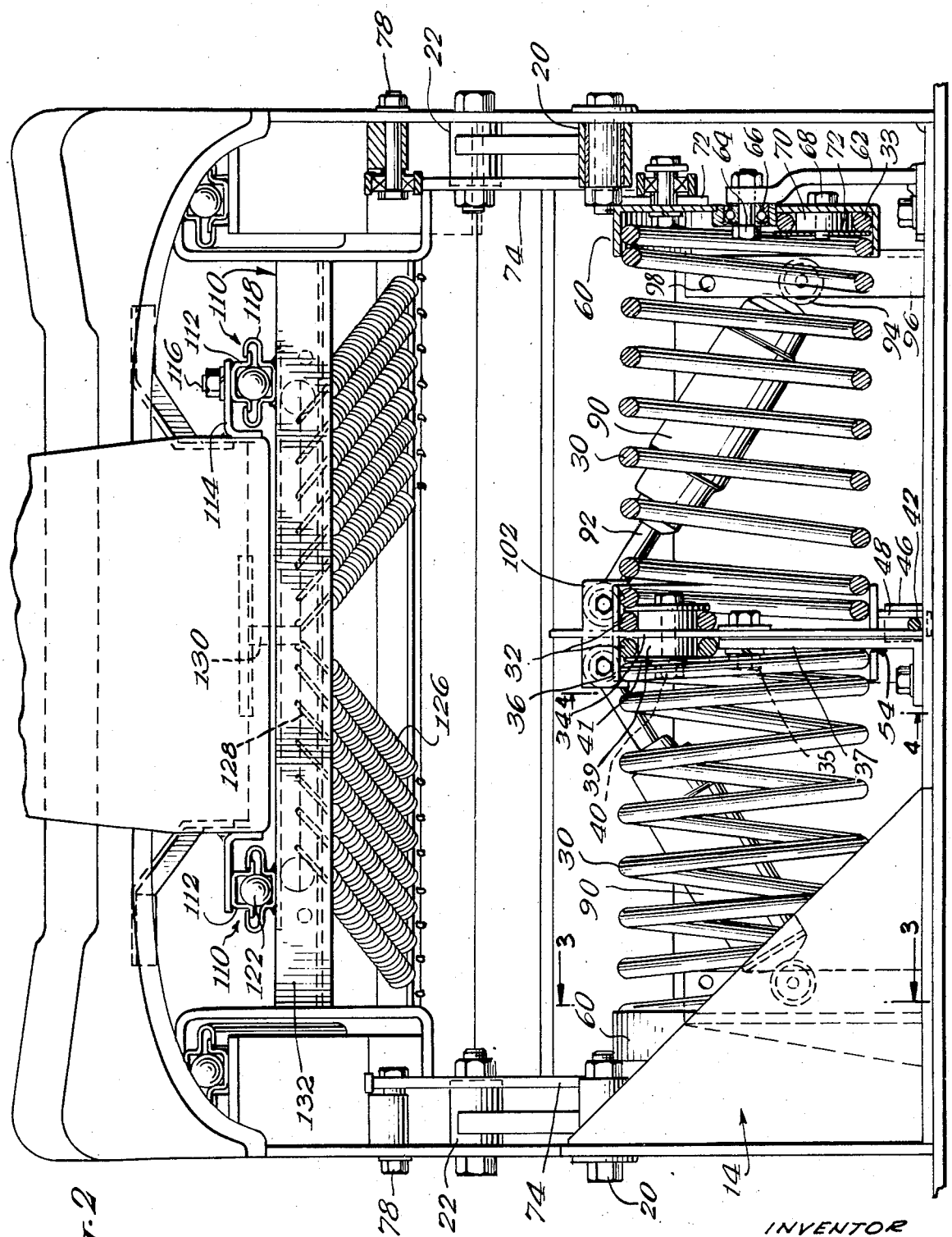

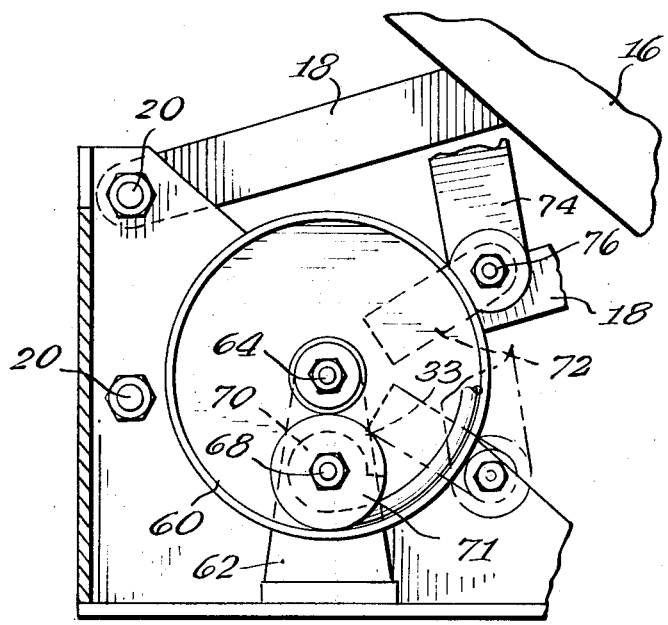
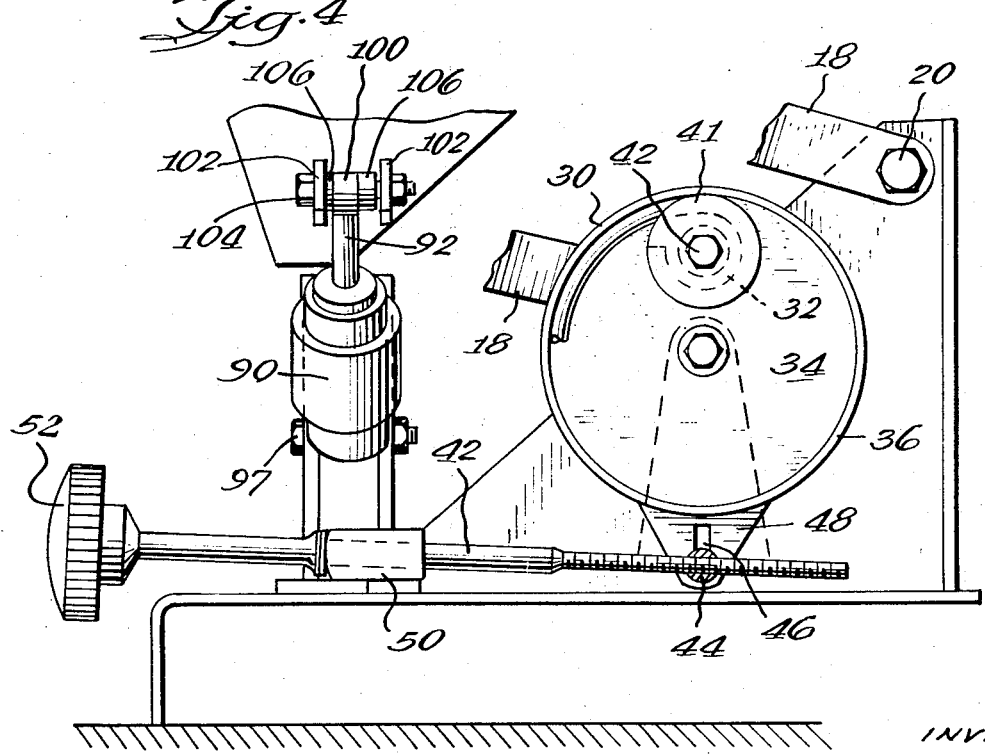

SEAT SUSPENSION SYSTEM

BACKGROUND OF THE INVENTION

The present invention relates generally to seat suspension systems and more particularly to a seat suspension system for heavy duty off-the-highway equipment.

In recent years, the matter of operator comfort has received an increasing amount of attention by manufacturers of heavy duty equipment, particularly farm equipment such as tractors, self-propelled combines and the like. This continuing interest has been directed towards providing increased seating comfort in the form of fully adjustable seat suspension systems to improve the riding qualities for the operator.

One type of arrangement which has found considerable commercial success is a seat suspension system which incorporates links which support the seat at one end and which are pivoted to a frame at the opposite end so that the seat may swing downwardly under the weight of the operator. The downward movement of the seat is resisted by some sort of spring arrangement which will impart a force tending to return the seat to its first or rest position. Some of these seat suspension systems also incorporate shock absorbers which further tend to resist the downward movement of the seat particularly when a sudden jar is encountered, as when the vehicle travels over rough terrain.

While such a seat arrangement has been used on many types of vehicles, there are several inherent disadvantages which are annoying to the operator.

One of the problems of heretofore known seat suspension systems is that the spring force applied to the seat was normally in the form of a constant force from a spring, such as a coil spring, arranged end to end between the seat and the frame. Such an arrangement is disclosed in Morrison et al. U.S. Pat. No. 2,954,071. The inherent disadvantage of an arrangement of this type is that an equal amount of force is applied during each increment of displacement of the seat relative to the frame.

Also, in order to prevent "bottoming out" it was heretofore considered necessary in a coil spring arrangement of the type disclosed in the Morrison et al. patent to also incorporate heavy shock absorbers which were axially disposed between the frame and the seat support and provided a dampening force during the entire extent of movement of the seat. Thus, if the vehicle were operated in rough terrain and a sudden upward movement of the frame were encountered, the shock absorbers could not accommodate this sudden movement to maintain the seat at a predetermined ride position.

Also, with such an arrangement, shock absorbers would not react with sufficient speed to accommodate a sudden downward movement of the frame resulting in having the seat move downwardly and leaving the operator suspended in mid-air. Stated another way, in order for the seat to move in either direction from the normal ride position, the shock absorbers in heretofore known seat constructions would have to be extended or retracted.

A further problem of the suspension system of the type referred to above, is that no provision is made for lateral shifting of the seat when the vehicle is transversely or longitudinally tilted. While prior proposals have been made to overcome this problem, such prior proposals have not come into general usage to any substantial extent for they either have been too complex and/or could only be incorporated into certain types of seat constructions.

BRIEF SUMMARY OF THE INVENTION

The present invention provides an improved stabilizing mechanism for a seat support and seat that is supported by parallel spaced links from a frame. The stabilizing means is in the form of a pair of axially aligned coil springs which are fixed in axial length and which have one end connected to the frame and the opposite end rotatable in response to displacement of the seat relative to the frame. The springs are arranged to produce an effective force which is non-linear relative to the displacement of the seat and more particularly the spring force varies exponentially relative to the deflection of the seat from the rest or raised position.

The stabilizing means further includes mechanism for adjusting the prestress of the springs when the seat is in the rest or first position. The stabilizing means further includes a pair of shock absorbers which are specifically positioned so that they will not dampen small displacements of the seat and support from its normal ride position.

According to a further aspect of the present invention, the vehicle seat suspension system further includes mechanism for isolating the seat from relative displacements of the frame and the vehicle in the horizontal plane. This arrangement is particularly important to prevent any sudden transverse movement of the operator when the vehicle is suddenly tilted transversely to the longitudinal axis or rapidly pivoted about the main axle of the tractor. The particular mechanism for isolation includes first and second pairs of perpendicularly disposed rail means each of which includes a first rail element fixed to the seat support and a second rail element fixed to the seat with antifriction means interposed between each of the first and second rail elements. The mechanism further includes resilient means or springs which tend to maintain the seat in a central position relative to the seat support but which will accommodate movement of the seat in four directions from the central position.

Thus, the vehicle seat suspension system substantially isolates the seat from vehicle displacement in transverse and longitudinal directions in the horizontal plane as well as vehicle displacement in the vertical plane and the spring force applied to the seat increases for each increment of seat displacement beyond the ride position and approaches infinity so that what is commonly called "bottoming out" is virtually eliminated.

BRIEF DESCRIPTION OF THE SEVERAL VIEWS OF THE DRAWINGS

FIG. 2 is an end view of the seat suspension shown in FIG. 1 as view, partly in section, from the rear end of a vehicle upon which it is supported;

FIG. 3 is a vertical sectional view taken generally along lines 3—3 of FIG. 2;

FIG. 4 is a vertical sectional view taken generally along lines 4—4 of FIG. 2.

DETAILED DESCRIPTION

Figure 1:
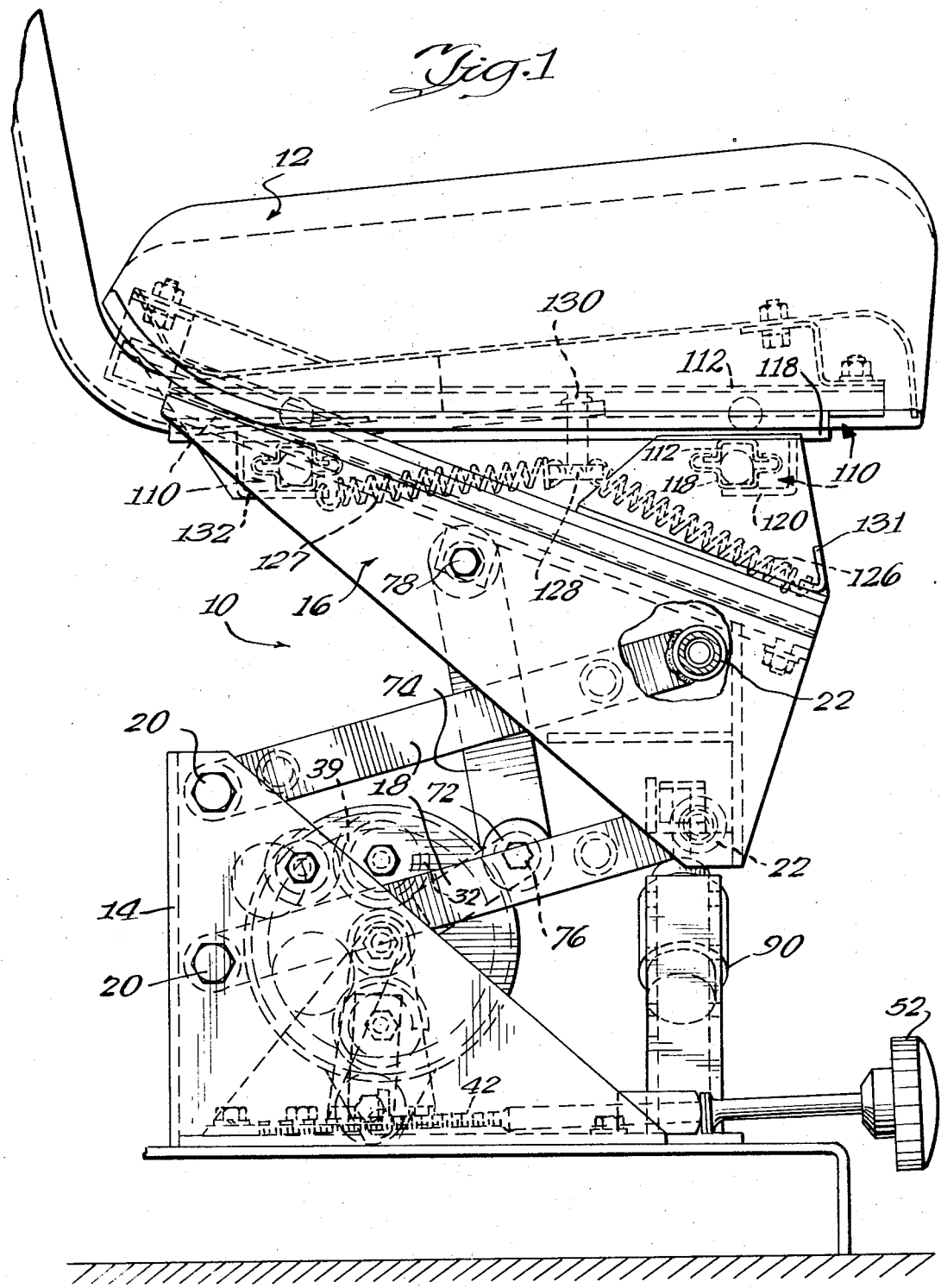
FIG. 1 is a side elevational view of the seat suspension system constructed in accordance with the present invention.

While the invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings discloses a seat suspension system 10 for supporting a seat 12 on a frame 14 which forms part of a vehicle (not shown). The seat suspension system includes an attachment structure or seat support 16 supported for displacement relative to the frame 14 by linkage means including first and second spaced parallel pairs of links 18. Each link is pivoted at one end at 20 on the frame and the opposite end is pivoted at 22 on the seat support. The four links 18 thus cooperate to define a parallelogram type linkage for suspending the seat support and seat on the frame.

As was indicated above, it is customary to provide some type of stabilizing means for resisting the downward movement of the seat relative to the frame and which maintains the seat support or attachment structure as well as the seat in a first position when the seat is unoccupied.

According to the present invention, the stabilizing means (FIG. 2) includes first and second coil springs 30 each having one end 32 connected to the frame and the opposite end 33 connected to the attachment structure or seat support. The means for connecting one end 32 of each of the coil springs to the frame includes a plate or element 34 rotatably supported on a pivot axis defined by a bolt 35 on a lug 37 extending upwardly from the base of the frame 14. The plate 34 has a pair of circular members 36 extending from opposite sides thereof and respectively receiving the ends 32 of the respective coil springs 30. The actual connection between the ends of the respective coil springs and the plate includes a sleeve or spacer 39 received on a bolt 40 with washers 41 maintaining the ends 32 of the springs on the sleeves and in engagement with the plate 34. Thus, tightening of the nut on the bolt 40 will simultaneously fixedly secure the adjacent ends of the respective coil springs to the plate.

According to another aspect of the present invention, the connection means between the frame and the coil springs includes adjustment means for changing the position of the ends of the respective coil springs to thereby vary the prestressed condition of the springs when the seat support or attachment structure is in the rest or first position. The adjusting means or mechanism includes an elongated rod (FIGS. 2 and 4) 42 having a threaded end received in a floating nut 44 carried by a support 46 extending between a pair of spaced plates 48 respectively secured to the plate 34 and one of the circular members 36.

The opposite end of the rod 42 is rotatably journaled in a support 50 forming part of the frame 14 and is axially fixed relative to the support member 50. The free end of the rod 42 has a knob 52 which is adapted to be grasped by an operator for rotation of the rod. In order to allow rotational movement of the plate 34 on the pivot axis 35, the lug or member 37 extends through a circumferential slot 54 formed in one of the members 36 so as to accommodate such rotational movement. It should be noted that the rotational axis for the plate 34, defined by bolt 35, is disposed on the axis of the respective springs which are in alignment with each other. Thus, the adjacent ends 32 of the springs 30 are rotated about the pivot 35 on a common radius.

The means for connecting the second or outer ends 33 of the respective coil springs to the seat support are identical in construction and only one will be described. The second means includes a shell or member 60 (FIGS. 2 and 3) rotatably journaled on a lug or member 62 extending upwardly from the base of the frame 14. The member or hub 60 has its rotational axis defined by bolt 64 which is again located on the common axis of the respective springs 30, for a purpose which will become apparent hereinafter. If desired, suitable bearing means 66 may be interposed between the bolt 64 and the member 60. The opposite ends of the respective springs 30 are again connected to the respective members 60 through a bolt 68 receiving a spacer or sleeve 70 and a washer 71 received on the free end of the bolt.

The second means for respectively connecting the opposite ends of the respective springs to the seat support each further include an arm 72 extending radially from the member 60 and rigidly connected thereto, as by welding. The free end of the arm is pivotally connected to one end of a link 74 through a bolt 76. The opposite end of the link 74 is likewise pivotally connected to the seat support or structure through a second bolt 78.

Figure 5:
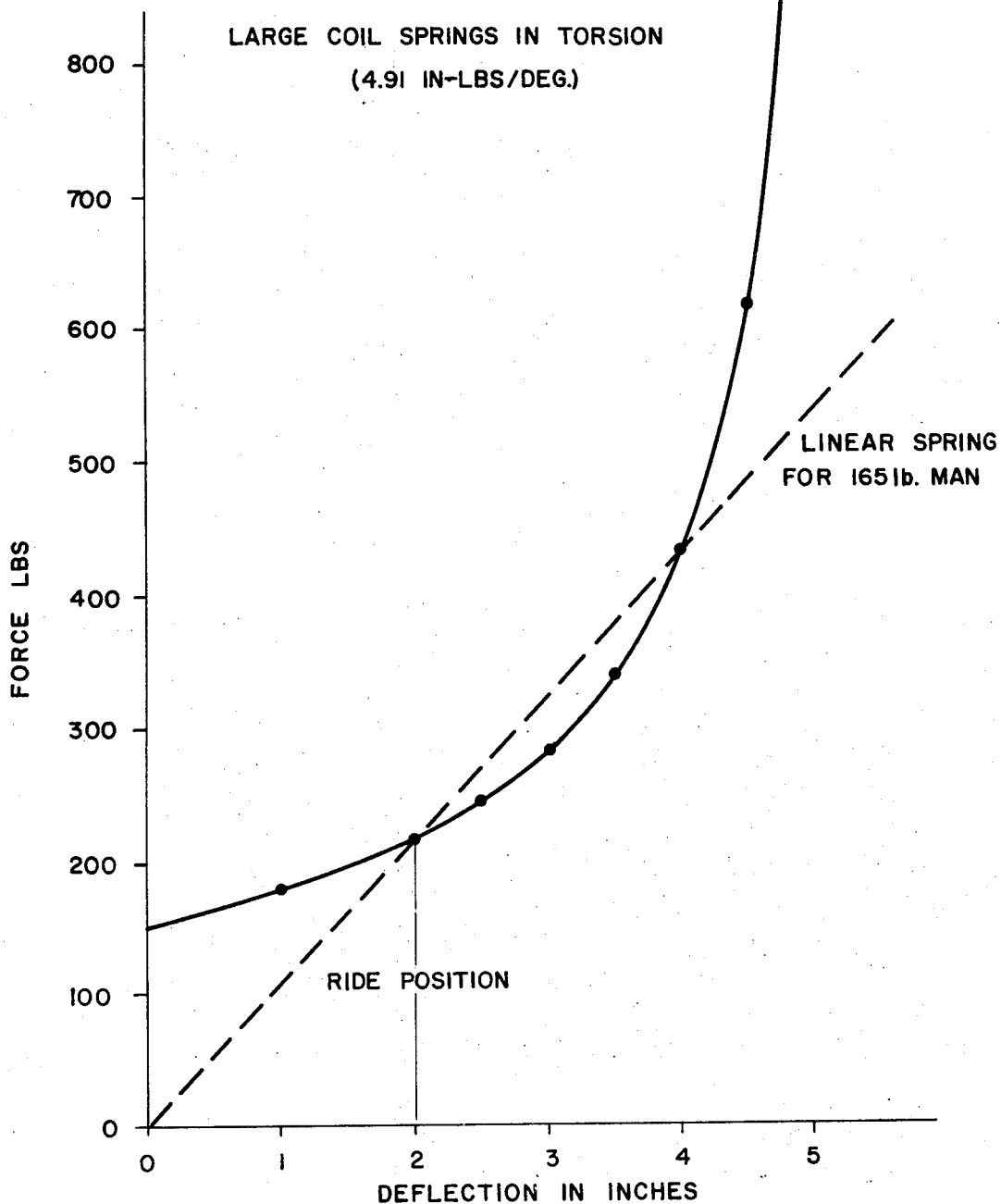
FIG. 5 is a graph showing the spring force in pounds verses seat deflection in inches.

Thus, downwardly displacement of the seat 12 and seat support 16 will rotate the outer ends of the respective springs about the central axis of either of the springs. It should be noted that the opposite ends of the respective springs are connected to the frame or supported on the frame in a manner that the opposite ends of each of the coil springs are maintained in a single plane which extends transversely of the axis of the spring so that the opposite ends of the springs are limited to rotation about the axis. Also, the longitudinal axes of the links 72 and 74 are substantially perpendicular when the seat is in the rest position shown in FIG. 1 and the movement of link 74 is substantially tangentially of the axis of rotation of the spring 30. However, in the normal ride position the links are at an acute angle and the movement of the link 74 will extend chordally of the axis of rotation of the spring 30. This arrangement, results in substantially equal spring force per increment of seat displacement between the rest and ride positions and an increased spring force for each increment of displacement of the seat 12 and seat support 16 beyond the ride position. The relationship of spring force and deflection or displacement of the seat from the rest position is graphically illustrated in FIG. 5. The deflection or seat displacement is charted in inches while the force of the spring is shown in pounds. It will be noted that during the original increments of movement of the seat from the rest position, the spring force per increment of movement will remain substantially constant to a point just beyond the ride position for a normal man selected as a man of approximately 165 pounds weight plus the weight of the seat support and seat. Beyond the normal ride position of the operator, the spring force-deflection curve rises sharply and approaches infinity. Thus, it will be seen that the spring force varies exponentially with respect to displacement of the seat beyond the ride position. This particular arrangement is of extreme importance in providing an increased force to the seat as the seat is deflected further downwardly than the normal ride position to prevent "bottoming out" and still utilize spring force during all portions of movement of the seat support and seat relative to the frame.

According to another aspect of the invention, the stabilizing means also includes a pair of shock absorbers which are positioned in a manner that no dampening force is produced by the shock absorbers when the seat is in the normal ride position. The shock absorbers are more clearly shown in FIGS. 2 and 4 and each include a cylinder 90 and a piston rod 92 which define relatively movable elements with the piston rod 92 being extensible and retractable relative to the cylinder 90. Each cylinder 90 has a collar 94 at one end thereof which is attached through bolts 97 to a bracket 96 extending vertically from the bottom of the frame 14. The brackets 96 are in the form of channel members having a plurality of sets of aligned openings 98 in the respective legs of the channels with each set of openings adapted to receive the bolt for connecting the cylinder 90 to the bracket 96. Thus, the position of the free or head end of the cylinder may be vertically adjustable by appropriate selection of the openings 98.

The free end of the second movable element or piston rod 92 is connected to the seat support or attachment structure through a collar 100 received between a pair of plates 102 which have openings to receive a bolt 104. Suitable bearings or antifriction means 106 may be interposed between the plates and the collar 100.

The selection of the set of openings 98 to be utilized for the connection of the cylinder to the bracket 96 is determined by the weight of the normal operator for the vehicle. Thus, for a relatively light operator, the upper set of openings 98 would be utilized while, with a very heavy operator, the lower set of openings would be utilized. The cylinder connection to the bracket is made so that during the normal ride position of the seat and seat support, the respective shock absorbers are in a substantially horizontal plane spaced below the horizontal plane defined by the seat 12 and extend perpendicular to the direction of movement of the seat. In this position, the relatively extensible and retractable elements 90 and 92 are in a substantially fully retracted position and will be required to be extended relative to each other when the seat support is moved in either direction from the normal ride position. This particular arrangement is of extreme advantage in providing a seat stabilizing mechanism which is capable of rapidly reacting to any sudden relative movement between the frame and the seat support in either direction from the ride position. The arrangement of the shock absorbers in this manner will have only the spring force acting on the seat support when the operator is in the normal ride position. It will be appreciated that the coil springs will very rapidly react to any small displacement of the seat in either direction from the ride position. For any large displacement from the ride position, the shock absorbers will be required to be extended and thereby will produce a dampening force for the seat and seat support when the seat support moves beyond the small, normal limits of movement desired.

According to a further aspect of the present invention, the seat suspension system constructed in accordance with the present invention also incorporates mechanism for accommodating horizontal movement of the seat relative to the seat support in a plurality of directions with the movement being resisted by resilient means and tending to maintain the seat in a central position. The resilient means has an increasing force as the seat moves from the central position to thereby prevent any sudden transverse movement or longitudinal movement of the seat relative to the seat support.

The mechanism between the seat and seat support includes a first and second pairs of rails 110 which extend perpendicular to each other and are spaced from each other. Each rail 110 includes similarly shaped and constructed first and second rail elements with antifriction means in the form of roller bearings 122 interposed to allow longitudinal movement of the rail elements relative to each other. The first pair of rail elements 110 (FIG. 2) includes a first rail element 112 fixed to the seat through a bracket 114 and bolts 116. The first pair of rails 110 also each include a second rail element 118, with the second rail elements of the first pair of rails fixed to the first rail element 112 of the second pair of rails (FIG. 1) as by welding. The second rail elements 118 of the second pair of rails are secured to the seat support 16 through brackets 120 and 132.

The mechanism for maintaining the seat in a central position relative to the seat support comprises two sets of springs 126 and 127 each having one end connected to the seat support and having the opposite end connected to the seat. The connection between the springs and the seat includes a transversely extending rail member 128 fixed to the seat through suitable support mechanism 130 so as to move with the seat. The opposite ends of the two sets of springs 126 and 127 are respectively connected to brackets 131 and 132 which are carried by the seat support.

The respective sets of springs 126 and 127 are each arranged in two groups angularly related to each other (see FIG. 2) and will tend to maintain the seat in a transverse central position. As the seat is moved transversely in either direction, as viewed in FIG. 2, one-half of each group of springs will produce an increased force tending to move the seat back to its centered position while the other half of each group of springs will have a decreased force which will further tend to allow the seat to the centered position. When the seat is moved fore and aft of the vehicle or left and right as viewed in FIG. 1 along the second group of rails, one group of springs will produce an increased spring force tending to center the seat while the second group of springs will produce a decreased centering force.

The particular arrangement of the springs and the rails will tend to maintain the seat in a centered position on each of the rails or rail means and will guide the seat for movement in opposite directions from the centered position with the resilient means accommodating the movement in response to sudden movement of the seat support relative to the seat to thereby partially isolate the seat from the seat support.

It should be noted, that the particular arrangement of the rails as well as the biasing means will allow movement of the seat in four directions from the centered position. Such movement in four directions will thereby accommodate any sudden pivotal movement of the vehicle about the transversely extending main axle or any pivoting of the vehicle and frame relative to its longitudinal axis. Thus, the particular attachment between the seat and seat support will allow the operator to remain in a substantially centered position and the springs will prevent any sudden transverse movement of the seat relative to the frame which, in extreme cases, could throw the operator from the seat.

As will be appreciated, the particular arrangement of the seat suspension means will substantially completely isolate the operator from movement of the frame relative to seat in either the horizontal or the vertical direction. Furthermore, the specific arrangement of the springs produce an increased spring force for each increment of movement beyond the normal ride position thereby substantially eliminating the possibility of the seat "bottoming out" and producing a sudden jar to the operator. Furthermore, in the normal ride position, the dampening force of the shock absorbers is completely isolated so that only the spring force of the torsional coil springs will be applied to the seat support and seat.

The entire mechanism is simple and inexpensive to manufacture and operate. In fact, once an appropriate prestress of the springs is made through the adjustment mechanism, and the shock absorbers are mounted in the appropriate position to be in a horizontal frame when the operator is seated thereon, the entire mechanism operates automatically without any additional attention of the operator. Furthermore, if the vehicle is to be operated for substantial periods of time by an operator having different weights, it is only necessary to reposition the shock absorbers so that they will be in the horizontal position when the heavier or lighter operator is supported on the seat.

What is claimed is:

1. In combination with a vehicle seat supported on a seat attachment structure in a substantially horizontal plane, a vehicle seat suspension comprising a frame; linkage means suspending said attachment structure on said frame; and stabilizing means tending to maintain said attachment structure in a rest position, said stabilizing means comprising a coil spring having an axis extending substantially parallel to said horizontal plane; first means connecting one end of said coil spring to said frame; and second means connecting an opposite end of said coil spring to said attachment structure in a manner to rotate said opposite end about said axis as a function of the movement of said attachment structure from the rest position to a ride position, said second means including a rigid arm connected to said opposite end of said spring and extending transversely of the axis of said spring, and a rigid elongate link pivotally connected at one end to said attachment structure and pivotally connected at its opposite end to said arm, said arm being located above the axis of said spring and the included angle between said arm and said link being at least 90° when said attachment structure is in the rest position, and said arm being located below the axis of said spring and the included angle between said arm and said link being less than 90° in the ride position so that displacement of said attachment structure beyond the ride position will cause said spring to produce a force which is non-linear and which increases substantially exponentially to the displacement of said opposite end.

2. The combination as defined in claim 1, including the further improvement of mechanism for attaching said seat to said attachment structure, said mechanism accommodating movement of said seat in opposite directions from a central position, said movement being along substantially perpendicular axes in said horizontal plane, said mechanism including resilient means tending to maintain said seat in said central position.

3. The combination as defined in claim 2, in which said mechanism further includes first and second rails extending perpendicular to each other, said rails each including first and second rail elements, said first element of said first rail being connected to said seat and said second element of said second rail being attached to said attachment structure.

4. The combination as defined in claim 3, including the further improvement of antifriction means interposed between each of said first and second rail elements.

5. The combination as defined in claim 1, in which said first means includes an element rotatable on said frame about the axis of said spring, said one end of said spring having a connection to said element at a point spaced from said axis, and means for rotating said element to adjust the prestress condition for said spring.

6. The combination as defined in claim 1, in which said second means comprises a member mounted for rotation only on said frame with said opposite end of said spring and said arm connected to said member.

7. The combination as defined in claim 1, including the further improvement of a shock absorber having first and second extensible and retractable elements, one of said elements connected to said frame and the other of said elements connected to said attachment structure, said shock absorber being positioned to have said elements in a retracted position when said seat attachment structure is in a ride position for an operator whereby said shock absorber elements must be extended relative to each other when the seat attachment structure is moved in either direction from said ride position.

8. In combination, a seat support, a seat mounted on said seat support in a substantially horizontal plane and facing in a direction of travel; a frame; linkage means suspending said seat support for vertical movement relative to said frame; stabilizing means for said seat and seat support comprising biasing means interposed between said seat support and said frame; and a pair of shock absorbers having first and second extensible and retractable elements respectively pivotally connected to said frame and said seat support, said shock absorbers being positioned on opposite sides of the centerline of said seat support and extending transversely with respect to said direction of travel of said seat, said shock absorbers being upwardly inclined between said frame and seat support in the rest position; and means defining a plurality of connection positions for one element of each shock absorber so that the elements may be connected at selected positions, depending upon the weight of the occupant of the seat, to locate the elements of each shock absorber in a substantially fully retracted, substantially horizontal position when said seat support and said seat are in a normal ride position whereby said elements must be extended when said seat support is moved in either direction from the normal ride position.

9. In a vehicle seat suspension having a seat support; a seat; and means mounting said seat on said seat support, the improvement of said means comprising first longitudinal rail means extending generally fore and aft of said seat; second longitudinal rail means extending generally transversely of said seat, each of said rail means having a pair of rail elements, one rail element of each rail means being respectively connected to said seat and said seat support, the second rail elements being interconnected; and resilient means for maintaining said seat in a centered position on each of said rail means, said resilient means including first and second spring means each having one end connected to said seat and an opposite end connected to said seat support, said first and second spring means converging upwardly from the point of connection to the seat support to the point of connection to the seat, said resilient means further including third and fourth spring means each having one end connected to said seat and an opposite end connected to said seat support, said third and fourth spring means conveying upwardly from the point of connection to the seat support to the point of connection to the seat, said rail means guiding said seat for movement in opposite directions from said centered position with said resilient means accommodating said movement in response to sudden movement of said seat support whereby to partially isolate said seat from said seat support.

10. A vehicle seat suspension as defined in claim 9, including the further improvement of a frame adapted to be supported on a vehicle; linkage means supporting said seat support for movement relative to said frame; and stabilizing means for said seat support; said stabilizing means including a coil spring having one end secured to said frame and the opposite end connected to said seat support; and means for maintaining the opposite ends of said coil spring in planes extending transversely of the axis of said spring whereby the opposite end of said spring is limited to rotation about said axis and arranged to produce a non-linear force on said seat support when said seat is moved from a first position.

11. A vehicle seat suspension as defined in claim 10, including the further improvement of said stabilizing means including a shock absorber having a first element connected to said frame and a second element connected to said seat support, said shock absorbers being positioned to have said elements in a fully retracted position when said seat is in a ride position of an operator supported thereon.

12. In combination with a frame having a seat support with a seat attached thereto and linkage means including first and second vertically spaced pairs of links each having one end pivotally connected to the frame and the opposite end pivotally connected to said seat support; stabilizing means for said seat and seat support comprising: first and second coil springs located end-to-end with the axes of said springs extending transversely of said links; first means connecting the adjacent ends of said springs to said frame; and second means connecting the remote ends of said springs to said seat support, said second means including a radially extending rigid arm connected to the remote end of each of said springs and interconnecting means cooperating with said arms for rotating said arms as a function of seat support displacement, said interconnecting means each being defined by a rigid elongate link pivotally connected at one end to said seat support and pivotally connected at its opposite end to one of said arms, said arms being located above the axes of said springs and the included angle between said arms and said links being at least 90° when the seat is in a first position, and said arms being located below the axes of said springs and the included angle between said arms and said links being less than 90° so that displacement of the seat support beyond the ride position will cause said springs to produce a force which is non-linear and which increases substantially exponentially to the displacement of said remote ends when said seat is in a ride position.

13. The combination as defined in claim 12, in which said first means includes a lug extending from said frame and disposed between said adjacent ends of said springs and a plate rotatable on said lug about the axes of said springs with said adjacent ends connected to said plate; and said second means includes first and second members rotatable about said axes with said arms connected to said members.

14. The combination as defined in claim 12, in which said stabilizing means further includes first and second shock absorbers each having extensible and retractable elements respectively attached to said frame and said seat support, said shock absorbers being in fully retracted condition when said seat support and seat are in a normal ride position for an operator.

15. The combination as defined in claim 12, including the further improvement of means accommodating relative movement between said seat and seat support and comprising first and second pairs of parallel rails each having first and second rail elements, said first rail elements of said first rails being connected to said seat and said second rail elements of said second rails being connected to said seat support, said first and second pairs of rails extending substantially perpendicular to each other; roller means between said first and second rail elements; and biasing means normally maintaining said seat in a central position relative to said seat support, said biasing means accommodating movement of said seat in any one of four directions from said central position in response to sudden movement of said seat support.

* * * * *